(12) United States Patent
Shostak (10) Patent No.: US 7,764,972 B2
(45) Date of Patent: *Jul. 27, 2010

(54) HETEROGENEOUS DEVICE CHAT ROOM SYSTEM AND METHOD

(75) Inventor: Robert E. Shostak, Portola Valley, CA (US)

(73) Assignee: Vocera Communications, Inc., Cupertino, CA (US)

( * ) Notice: Subject to any disclaimer, the term of this patent is extended or adjusted under 35 U.S.C. 154(b) by 632 days.

This patent is subject to a terminal disclaimer.

(21) Appl. No.: 11/710,119

(22) Filed: Feb. 22, 2007

(65) Prior Publication Data
US 2008/0125158 A1 May 29, 2008

Related U.S. Application Data

(63) Continuation-in-part of application No. 10/781,438, filed on Feb. 17, 2004, now Pat. No. 7,206,594.

(51) Int. Cl.
H04B 7/00 (2006.01)

(52) U.S. Cl. .................... 455/519; 455/518; 455/414.1; 455/420

(58) Field of Classification Search ................. 455/519, 455/518, 414.1, 517, 426.1, 458, 466, 459, 455/41.2, 420; 370/312, 328, 390; 709/206, 709/202, 230, 205, 204, 227
See application file for complete search history.

(56) References Cited

U.S. PATENT DOCUMENTS

| | | | |
|---|---|---|---|
| 7,206,594 B2 * | 4/2007 | Shostak | 455/519 |
| 2003/0018726 A1 | 1/2003 | Low et al. | |
| 2003/0217096 A1 * | 11/2003 | McKelvie et al. | 709/202 |
| 2004/0203363 A1 | 10/2004 | Carlton et al. | |
| 2005/0181815 A1 * | 8/2005 | Shostak | 455/519 |
| 2006/0168049 A1 * | 7/2006 | Orozco et al. | 709/206 |
| 2006/0173959 A1 * | 8/2006 | McKelvie et al. | 709/204 |
| 2006/0212518 A1 * | 9/2006 | Bailey et al. | 709/205 |

OTHER PUBLICATIONS

PCT/US 08/01966, International Search Report, May 20, 2008.
PCT/US 08/01966, Written Opinion, May 20, 2008.
PCT/US 08/01966, International Preliminary Report, Aug. 26, 2009.

* cited by examiner

*Primary Examiner*—Tan Trinh
(74) *Attorney, Agent, or Firm*—DLA Piper LLP (US)

(57) ABSTRACT

A chat group system and method are provided that permit a communications system to implement an easy-to-use, multi-user, push-to-talk, instant communications functionality with heterogeneous access devices.

16 Claims, 6 Drawing Sheets

HETEROGENEOUS DEVICE CHAT ROOM SYSTEM AND METHOD

PRIORITY CLAIM/RELATED APPLICATION

This application is a continuation in part of and claims priority under 35 USC 120 to U.S. patent application Ser. No. 10/781,438, filed on Feb. 17, 2004 now U.S. Pat. No. 7,206, 594 and entitled "A Wireless Communication Chat Room System and Method" which is incorporated herein by reference.

FIELD OF THE INVENTION

This invention relates generally to a system and method for providing communications among individuals and in particular to a system and method that adds an easy-to-use, multi-user, "chat" capability to a communications system that has heterogeneous access devices that are used as access points to the communications system.

BACKGROUND OF THE INVENTION

Various different communication devices are well known and form a large part of our everyday lives. Examples of the well known wireless communication devices include walkie-talkies and other simple two-way radios, cellular phones, pagers, and Palm-type handheld devices that permit e-mail or Internet access. Simple two-way radios require no network infrastructure, since each radio communicates directly with each other radio. However, simple two-way radios also offer none of the network-based features people expect of a modern communications system, such as the ability to set up a private connection between two communications devices using an identifier such as a phone number or name. Each of the other examples given of communications devices requires an expensive network infrastructure to operate correctly.

One area where communication devices can play an important role is in the workplace, to allow mobile employees to communicate with one another. Many workplaces have already installed a wireless computer network to support wireless devices such as laptop computers. These wireless computer networks use a standard wireless networking protocol, such as one of the 802.11 standards, and consist of one or more wireless access points, typically installed in the ceiling of a building. The access points communicate with various wireless devices using the selected standard wireless networking protocol, and communicate with each other, and with other computers, over a standard wired computer network, such as Ethernet. Since a full-featured modern communication system requires a network infrastructure to operate correctly, it makes sense to develop a wireless communications system which uses a typical wireless computer network (such as one based on an 802.11 standard) as its network infrastructure. This makes it possible to deploy a wireless communications system without the need to deploy a completely separate parallel wireless network.

A desired feature of a communications system, especially one intended for use in the workplace, is the capability to allow multiple users to talk to each other as a group. Ideally, this feature would be easy to use, offer virtually instant response, and would not require one user to individually contact every other member of the group to initiate a communications session. Some wireless devices, such as walkie-talkies and some cellular phones, provide a feature with some or all of these characteristics. This feature is inherent in the way walkie-talkies operate, since any voice message transmitted by a walkie-talkie is heard by any other walkie-talkies nearby which are tuned to the same frequency channel. When this feature is provided on a communications system which does not use walkie-talkies, it is often patterned on the way walkie-talkies are used. The users place themselves in a special mode, and select which pre-defined group they wish to be a part of (this selection is roughly the equivalent of selecting the frequency channel on a walkie-talkie). Once the mode is activated, transmission of a voice signal to other group members is typically controlled with a single button, with the user pressing the button the entire time they wish to transmit. This type of multi-user communications session, based roughly on the push-to-talk mode found on typical walkie-talkies, will be referred to as a "chat" mode.

There are communications systems on the market which are based on a typical wireless communication network such as one of the 802.11 protocols, but these systems do not typically provide a chat mode. Implementing a chat capability in a voice communications system based on a typical wireless computer network, such as one of the 802.11 protocols, brings up several problems not typically encountered with walkie-talkies. These problems include power consumption, system latency, and a limitation on the rate that communications packets can be efficiently processed by the network.

A typical walkie-talkie does not consume much power while listening for communications. It can therefore be left in a listening mode, with its receiver turned on, the entire time it is being used, with no great penalty paid in battery life. In contrast, a wireless device based on a wireless computer network typically consumes significant power when listening for communications. The state of a typical wireless device intended for use with a wireless computer network is therefore changed whenever incoming communications signals are not expected, with the receiver turned off most of the time to reduce power consumption. This power management has the side effect of adding significant latency to the system when incoming signals actually arrive. It takes time for each device to realize new communications are coming in, and to change its state back to a listening state, with the receiver turned on. This added system latency, if it occurred each time a member of a chat group started transmitting a voice signal, would defeat the intended purpose of the feature, which is to provide easy-to use instant communication between group members.

An additional complicating factor is the network limitation on the rate that communications packets can be processed and delivered by the network. For any system based on a typical computer network, all communications signals will be placed into packets based on the well-known Internet Protocol (IP). The wireless access points and various components of a typical wired computer network must process each of these IP packets separately, and there is a limit to the rate at which packets can be efficiently processed. The standard IP packet is transmitted from one transmitting device to a single receiving device, and is called a unicast packet. If a chat mode communications session involved a large number of users, and each user's device communicated with each other device using unicast packets, the rate of transmitted packets could easily grow too large. Because of this, it is desired that the chat feature be implemented as much as possible using a different type of packet called a multicast packet, which allows one transmitting device to send the same single packet to multiple receiving devices, greatly reducing the total number of packets which must be processed by the network. However, the use of the multicast packet complicates the tradeoff between power consumption and system latency described above, because a device that has changed its state to the low-power state, with its receiver off most of the time, typically ignores multicast packets on the network. Failure to ignore multicast packets can significantly increase power consumption in this low-power state. Therefore, if optimum power consumption is to be achieved in the low-power state, only a unicast packet can reliably be counted on to reach the device and "wake it up", returning it to the full listening state. Thus, a wireless communication device that is based on a typical wireless computer network, provides a chat capability, resolves the tradeoff between power consumption and latency, and which primarily uses multicast packets to implement the feature without increasing power consumption, is desirable. It is to this end that the present invention is directed.

SUMMARY OF THE INVENTION

The communications system provides chat functionality, allowing easy-to-use instant communication among multiple users. To accomplish this, the system simulates the walkie-talkie by providing "push-to-talk" operations. A user with one of the heterogeneous access devices may be a part of a chat group and may then be able to instantaneously communicate with other members of the chat group. In a preferred embodiment, this is done by pressing and holding the "call" button of an access device so that the user does not need to contact each of the members of the chat group separately, and does not need to take extra steps to identify the intended recipient of the communication (i.e. no dialing of a phone number or issuing of a specific voice command is required—only a single button press). The communication system may support a practically unlimited number of separate chat groups wherein each chat group and its current members are stored in a database that is part of the communications system. The system permits multiple simultaneous chat groups to be active wherein each chat group may include different membership. The users within the same chat group may interact with each other using the chat functionality. The set of possible chat groups and their initial membership is predefined by the administrator of the communications system, using the system configuration tools available to him/her, but the current membership at any time is dynamically controlled by each user. Each of the users, with a simple voice command issued using the access device, can join or leave any of the pre-defined chat groups as they wish, although, in a preferred embodiment, each user can belong to only one chat group at any point in time.

In accordance with a preferred embodiment of the invention, the chat method is implemented in which a user may press and hold a call button of his/her badge to initiate a chat session with the members of his or her chat group. The access device will provide some sort of feedback to indicate that the user has control of the chat session. For example, the badge may emit a chime to indicate that the user may begin talking. Once the user begins talking, the other members of the chat group hear the talker. When the talker is finished, he or she releases the call button and then the other members of the chat group hear a sound indicating that the talker has finished, and that another user may now attempt to get control and reply. In the preferred embodiment, if multiple users press their call buttons to attempt to gain control, the first to press is given control, and hears the chime indicating he or she may begin talking, while other users who press their call button hear a warning tone. This warning tone indicates that another user has control and is talking.

To implement the chat functionality in a communications system based on a wireless computer network, such as one that uses an 802.11 (b) or (g) protocol, the system must resolve several issues including tradeoffs between power consumption, system latency, and efficient use of multicast packets. The communications system in accordance with the invention does resolve these issues successfully.

DETAILED DESCRIPTION OF EXEMPLARY EMBODIMENTS

The invention is particularly applicable to a voice-controlled wireless communications system that uses wireless access points based on an IEEE 802.11 (b) or (g) protocol and an Ethernet wired computer network to provide the network infrastructure for the communications system. It is in this context that the invention will be described. It will be appreciated, however, that the chat room system and method has greater utility, since it can be implemented using various different communication protocols (both wired and wireless), various different computer networks, various different access devices and various different concentrators so that it may be applicable to other communications systems where it is desirable to be able to provide a chat capability.

Figure 1:
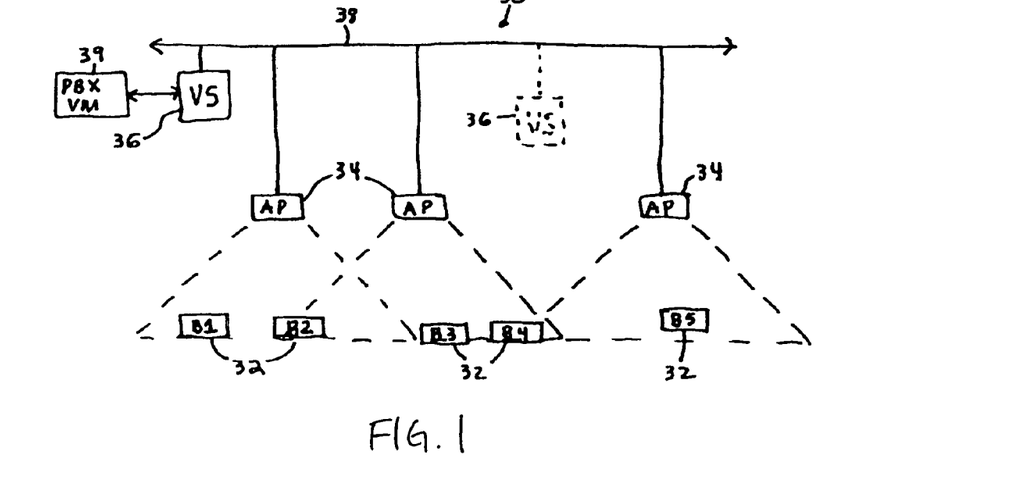
FIG. 1 depicts an example of an embodiment of the voice-controlled communications system.

FIG. 1 illustrates an example of an embodiment of the voice-controlled communications system 30 in accordance with the invention. In particular, the system comprises a plurality of heterogeneous access devices referred to as badges 32 in this embodiment (marked B1-B5 in this example), one or more concentrators 34 (marked AP) such as 801.11 (b) or (g) wireless access points in the exemplary embodiment and one or more central computers referred to as controlling computers 36 (marked VS), as shown. The concentrators 34 in FIG. 1 may be standard off-the-shelf wireless access points, such as a standard 802.11 (b) or (g) wireless access point in the exemplary embodiment, which collectively implement a wireless network allowing the badges 32 to communicate with other components of the communications system 30. The concentrators 34 communicate with each other, and with the controlling computer 36, over a computer network 38 which may be a local area Ethernet network in a preferred embodiment. Taken together, the concentrators 34 and the computer network 38 provide the network infrastructure for the communications system 30. Any of the controlling computers 36 may also be interfaced to a telephone system such as a Private Branch Exchange (PBX) system 39, which allows the communications system 30 to communicate with common telephone communication systems.

Figure 2A:
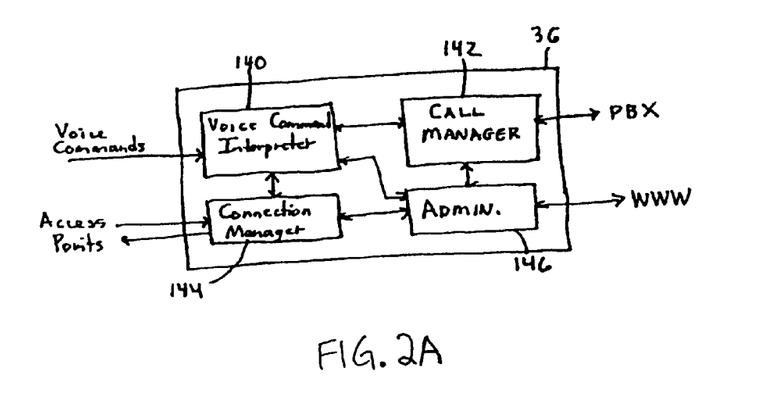
FIG. 2A depicts details of the controlling computer (CC) shown in FIG. 1.

In the exemplary embodiment, the controlling computer 36 in FIG. 1 may be a typical off-the-shelf computer system, such as a typical server computer, the hardware details of which are well known. The controlling computer may additionally have hardware and software that permits the controlling computer to interface to a telephone and/or PBX system, such as a telephone interface, and a computer network interface that permits the controlling computer to connect to the computer network. The controlling computer may also include a database for storing data associated with the wireless communication system and may have an associated web server that permits web-based access to the controlling computer for configuration and administration of the system. The controlling computer 36 is responsible for the overall control of the communications system, and its functionality is implemented in a set of Java and C++ software application programs running under an operating system, such as a Windows-based operating system in a preferred embodiment. FIG. 2A illustrates more details of the controlling computer 36. In particular, the functional blocks of the Java and C++ software application programs are shown in more detail. The software may include a voice command interpreter 140, a call manager 142, a connection manager 144 and an administrator 146. The voice command interpreter 140 may be a component that includes a software-based speech engine, such as the commercially available Nuance speech engine, is built onto the speech engine and has responsibility for interpreting and executing voice-based commands received from the badges. The call manager 142 has responsibility for the set-up and the breakdown of two-party and multi-party calls and maintaining status information associated with these calls. The connection manager 144 is the component that is responsible for managing concentrators and the connections between badges and concentrators. It is also supports hands-off from one concentrator to another as a badge roams about the network. The administrator module 146 supports administrator-level and user-level configuration and monitoring of the system through a web browser interface as shown.

Figure 2B:
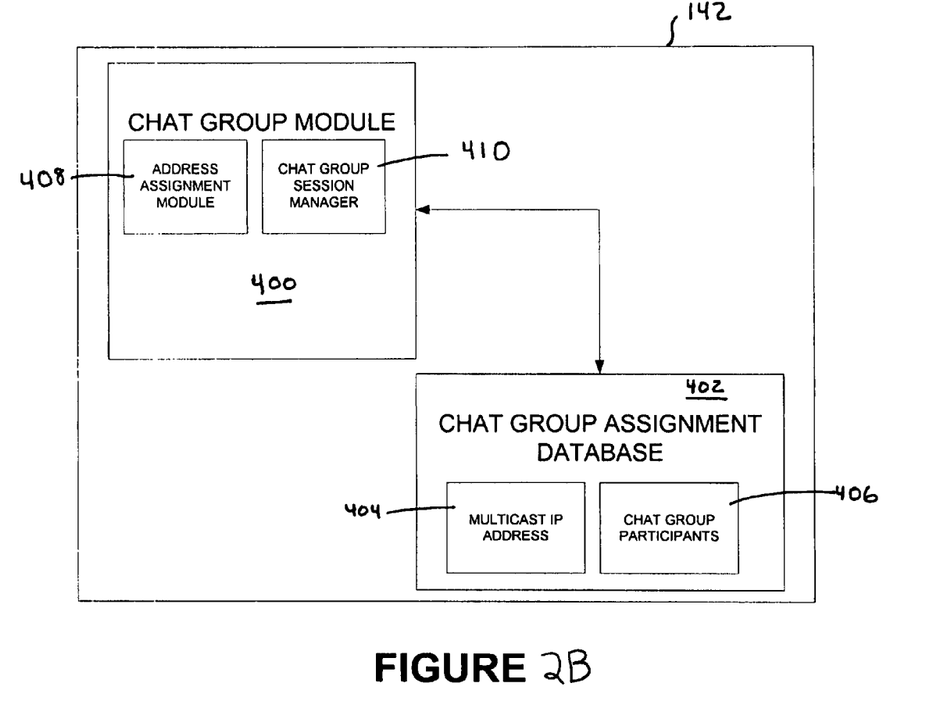
FIG. 2B illustrates more details of the controlling computer incorporating a chat room system.

FIG. 2B illustrates additional software components which may be added to the controlling computer's call manager software 142 to implement the chat feature. The chat-related controlling computer software may include a chat group module 400 and a chat group assignment database 402. In a preferred embodiment, the chat group module 400 may be one or more pieces of software that implement the chat group functionality as described below. As is well known, the one or more pieces of software of the chat group module may include a plurality of computer instructions. The chat group assignment database 402 may be part of a larger database used by the controlling computer in connection with other features of the wireless communication system, or may be its own database that may be stored in memory, in a database server, etc . . . as is well known. As shown, the chat group assignment database 402 may include, for each chat group, at least a multicast IP address 404 currently assigned to the particular chat group and a chat group membership list 406 that contains a list of the users of the system that are currently members of the particular chat group. In accordance with the invention, users of the system, via a voice command to the controlling computer, may add/remove themselves from the chat group participant list 406.

The chat group module 400 may include an address assignment module 408 and a chat group session manager 410 wherein each of these may preferably be one or more pieces of software comprising a plurality of computer instructions and data as is well known. The address assignment module, when it receives a request for a new chat session from a badge as described below, assigns a particular multicast IP address to the new chat session. The address assignment module may then store the assigned multicast address in the database 402 and may then communicate the assigned multicast IP address to the badges of the chat group participants. The chat group session manager 410 may control the address assignment module and may coordinate each chat group session such as generating and sending out the messages to the badges that are part of the particular chat group session. In more detail, the chat group session manager may set-up and terminate each chat session, establish and monitor a software-based timer as described below, and generate, send and receive unicast messages to set-up and terminate each chat session.

Figure 3A:
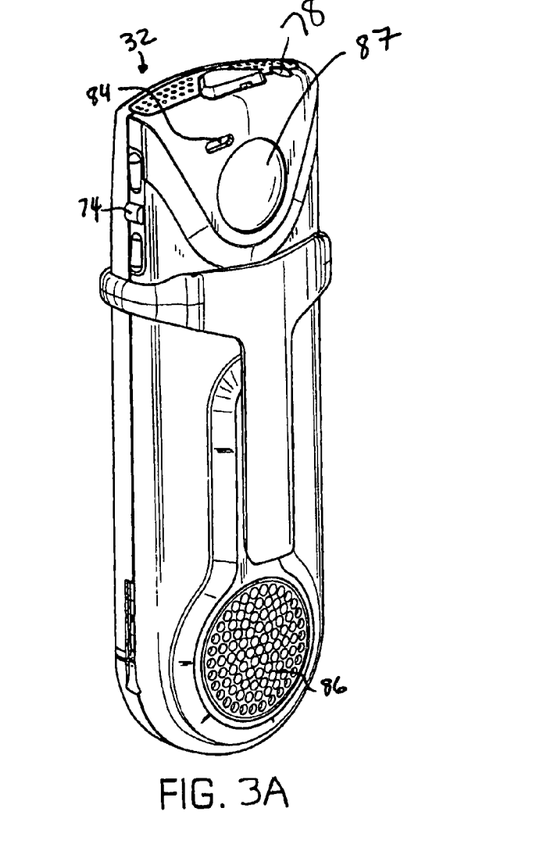
FIG. 3A depicts an embodiment of each badge (B1, B2, . . . , B5) shown in FIG. 1.
Figure 3B:
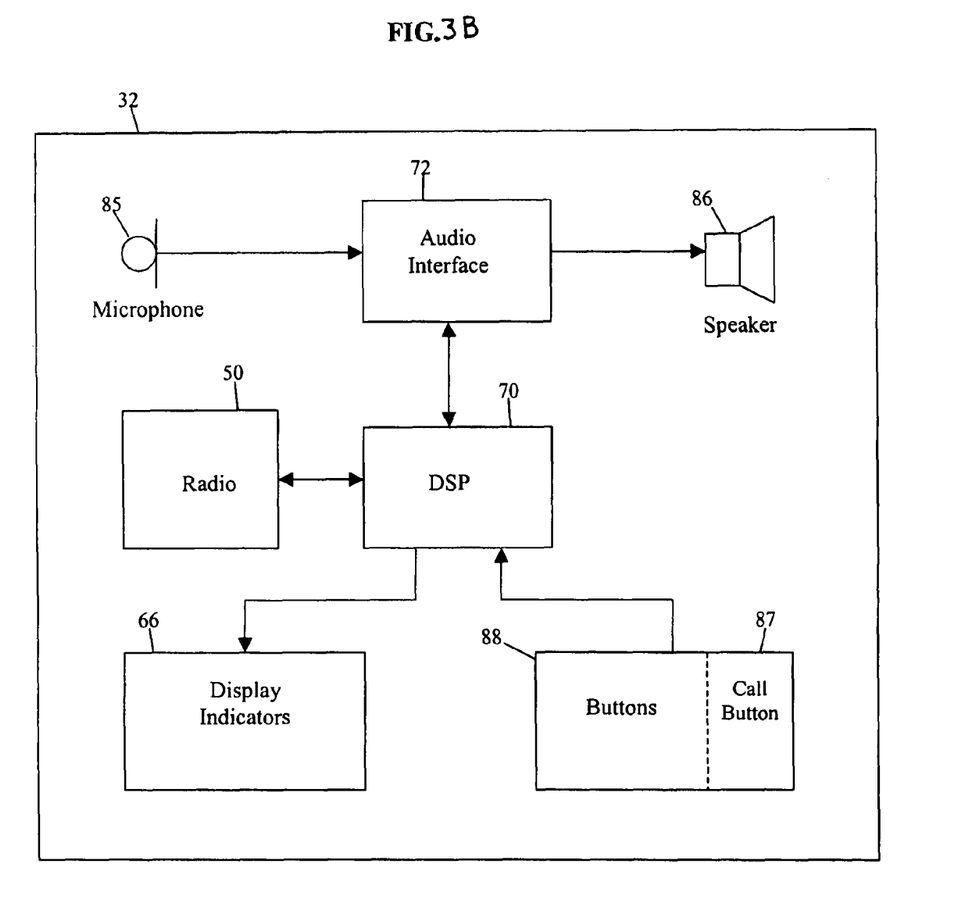
FIG. 3B depicts a block diagram illustrating the hardware components of the badge.

Each access device 32 may be various different devices that are able to access the communication system. In the exemplary embodiment, each access device 32 in FIG. 1 is a wireless communications device that is capable of communicating with an concentrator 34, and therefore is also capable of communicating with the controlling computer 36 in order to implement the desired wireless communication functions. Each badge 32 serves as one of the primary communications endpoints of the system. FIG. 3A illustrates a preferred embodiment of the communications badge 32 in accordance with the invention, and FIG. 3B is a block diagram illustrating the hardware components of the badge 32 in accordance with the invention. In a preferred embodiment, each badge 32 is a portable, battery-powered, wireless device that supports hands-free, full duplex voice communications using a small microphone 85 (mounted behind microphone port 84) and a speaker 86. The badges are sufficiently small and lightweight enough that they may be clipped onto a shirt pocket of the user or may be worn on a lanyard around the neck of a user. Each badge 32 has a Digital Signal Processor (DSP) 70 which serves as a programmable controller of all other badge hardware. The DSP may include a processor and memory that stores the software resident on each badge. The DSP may, for example, generate a unicast packet when the call button is depressed, receive a unicast packet from the controlling computer to wake up the badge for a chat session and receive and decode the multicast packets associated with a chat session and generate the audible signals sent to the speaker during a chat session. The DSP 70 is interfaced to a radio 50 for communication with the communication system's concentrators. The DSP is interfaced to the microphone 85 and the speaker 86 through an audio interface 72. The DSP is also interfaced to various display indicators 66 and to various buttons 88 including a "Call Button" 87, which is generally used to initiate communications sessions. Further details on badge 32 are provided in pending U.S. patent application Ser. No. 09/947,235, which is incorporated herein by reference.

In addition to the badge access device shown in the exemplary embodiment, the communication system may operate, for a chat session as described below, with two or more access devices that are heterogeneous in that the access devices that participate in a chat session are any combination of the badge access devices described above as well as the other access devices described below. For example, the access devices that participate in a chat session using the communications system may include a wired phone, a processing unit based device having a microphone and speaker (not shown) that may be a phone, a computing device with a badge application that operates like the badge described above, a cellular phone, a mobile phone, a Smart phone, a Blackberry-type device with a built-in communications capability, a Palm operating system based device with a communications capability, a Windows CE-based device with a communications capability or any other device that has a speaker, a microphone and sufficient processing power, memory and connectivity to be an access device for the voice-controlled system. These access device may also have the typical elements of the badges such as a display device, a processing unit, a communications unit, a memory and the like. Each access device may also include a power source (not shown) and may include the other elements of the badge described above that are not shown or described herein. Each access device may also provide the "Call Button" functionality of the badge such as by mapping a key on the access device to the "Call Button" functionality, by providing a user interface that has a "Call Button" or by using a soft button of the access device for the "Call Button." For these above different access devices, the system may use different concentrators wherein the concentrators may be selected from a cellular base station (for a cell phone), a wireless 802.11 (b) or (g) access point, a mobile device data access point (for a GPRS or EDGE device) or a pager base station or the like depending on the types of access devices being used for the system. For a wired phone type access device, the system does not necessarily need one or more concentrators, but the wired phone type access device communicates over a network, such as a PSTN, PBX or IP network (for an IP phone device), to the control computer to access the voice recognition of the communication system.

Each access device has two distinct hardware operational states which are particularly relevant to the invention. In the standby state, an access device consumes minimal power and is the state when the access device is idle. In the active state, the access device consumes full power, can be involved in active communications sessions, and will receive any packets transmitted to the access device. In the standby state, the access device consumes much less power, cannot be involved in active communications sessions, and cannot be reliably counted on to receive multicast packets. During the standby state, however, the access device can reliably receive unicast packets, and upon receipt of a unicast packet can "wake-up" and enter the active state. However, when an access device is transitioning from the standby state to the active state, a setup time exists that introduces system latency. A chat group session may involve many members speaking in turn. While each member is talking, all access devices used by members of the chat group must be in the active state. For minimum power consumption, after a member is done talking, all access devices used by group members would return to the standby state. If this is done, however, the setup time to transition from standby to active state would occur each time a group member pushed their call buttons to reply. This would add unacceptable system latency in the chat mode, and would defeat the desired instant communications nature of the feature. On the other hand, access devices cannot remain in active mode at all times a chat message could be received, without unacceptable compromises in power consumption (and therefore battery life). To solve this problem, the invention utilizes a set of state transitions, including a timeout feature, as described below, so that access devices can be in active mode whenever an incoming chat message is most likely to be received, but in standby mode otherwise. Because of this, a typical chat group session involves the standby-to-active state transition only once, minimizing system latency problems while conserving power. For both the badge access devices and the other access devices described above, the control computer may send a chat request command to the access device to initiate a chat session. For the badge access device, the chat request command may be a wake-up packet sent to the badge access device.

Figure 4:
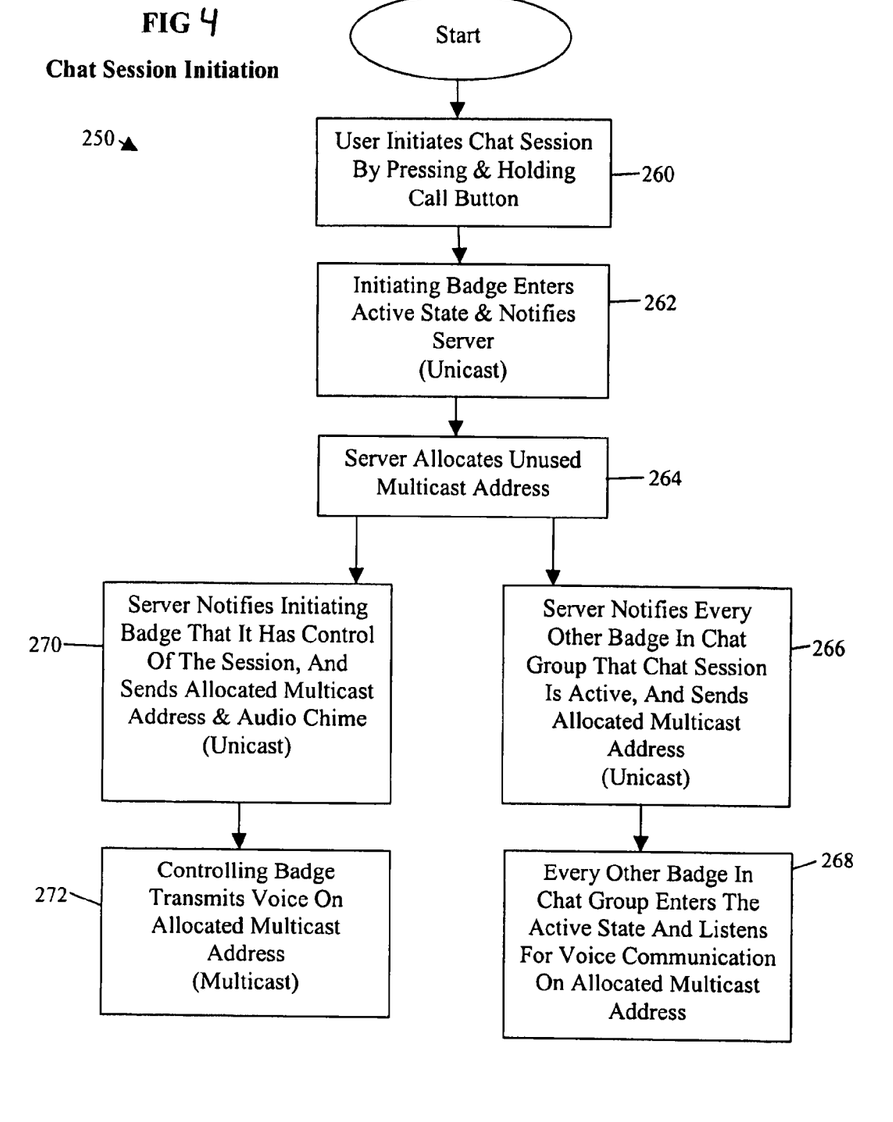
FIG. 4 is a diagram illustrating an example of initiation a chat room session implemented using the voice controlled communications system described above.

Now, a method for performing a chat group communications session in accordance with the invention over a wireless communications system will be described in more detail. FIG. 4 is a diagram illustrating an example of the initiation of a chat session. In step 260, a user with a badge who wants to speak while in a chat group (in which his voice is transmitted to all other users that are part of the same chat group), may press and hold an activation button, such as the call button of the badge in the preferred embodiment of the invention. In step 262, this initiating user's badge enters the active state, and transmits a unicast packet to the controlling computer of the wireless communications system, notifying the controlling computer of the intention to initiate a chat session. In step 264, the controlling computer allocates a currently unused multicast IP address, which will be used for the chat session. In step 266, the controlling computer notifies, using a unicast packet, badges belonging to each member of the chat group other than the initiating badge that a chat session is active and wakes-up the each badge, and informs each badge of the multicast IP address which should be used for the session. This notification is done using unicast packets, so that any of the badges which are currently in the standby state will wake up and transition to the active state for the session. In step 268, each badge other than the controlling badge enters the active state if it is not already active, and listens for voice communication on the specified multicast IP address. Each badge plays any incoming voice signals over its speaker, for the user to hear. In step 270, the controlling computer uses unicast packets to notify the initiating badge that it has control of the chat session, and sends an audio chime to the controlling badge, which is played over its speaker, informing the user that he or she can begin to talk. Finally in step 272, the controlling badge begins to transmit a voice signal (from its microphone) on the specified multicast address. At this point, the chat session is underway, and the controlling user can be heard by all other members of the chat group.

Figure 5:
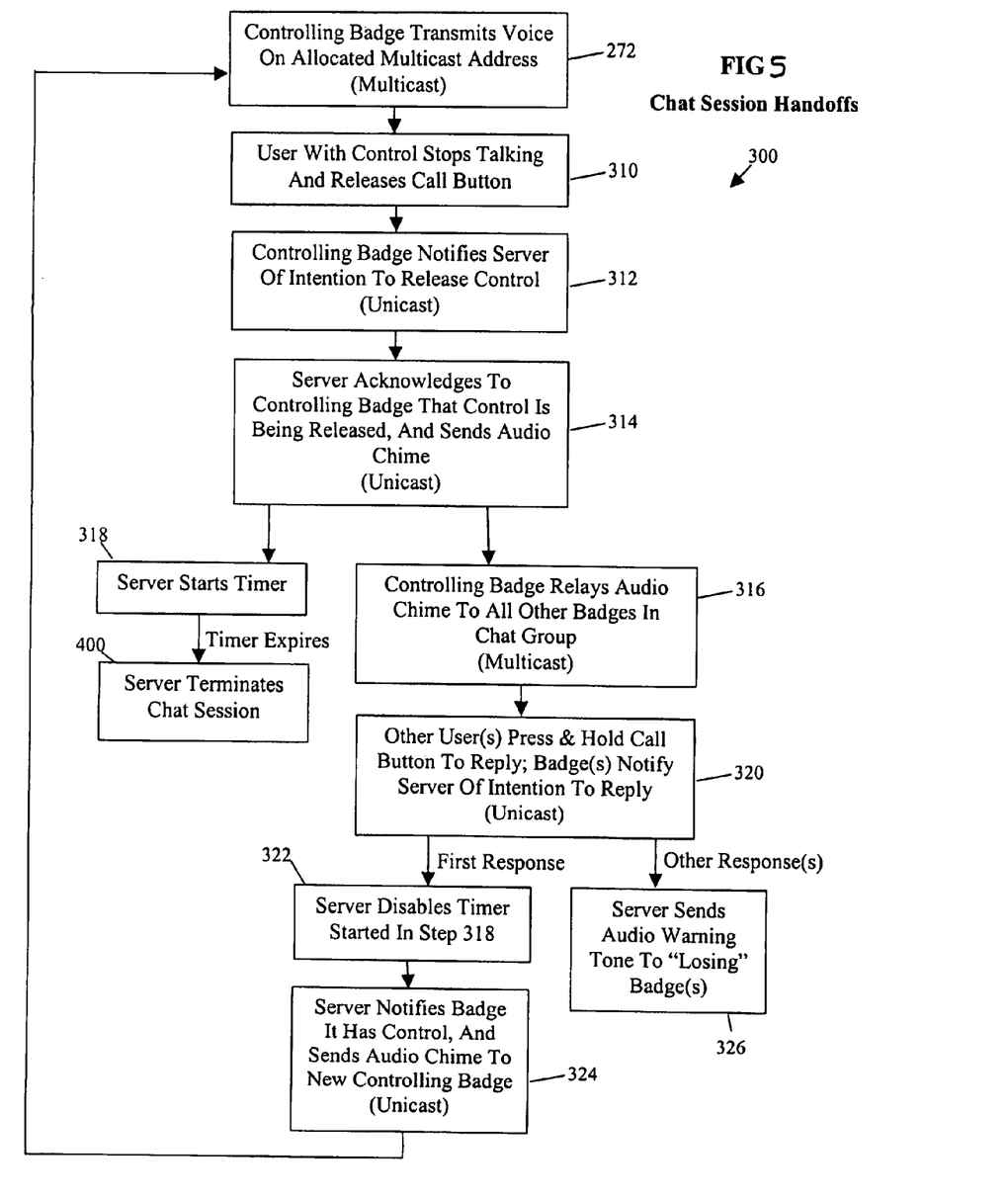
FIG. 5 is a diagram illustrating an example of management of the handoff between the various talkers in a chat room session implemented using the voice controlled communications system described above.

The next relevant event is the handoff that must take place when the controlling user is done talking to other members of the chat group and another member wants to respond, taking control of the session. FIG. 5 is a diagram illustrating an example of a preferred method 300 for the management of this handoff. In this diagram, the initial state is the same as in step 272 of FIG. 4, with the controlling badge transmitting voice using the allocated multicast IP address. In step 310, the user with control stops talking and releases his or her call button. In step 312, the controlling badge sends a unicast packet to the controlling computer, notifying the controlling computer of the intent to release control of the chat session. In step 314, the controlling computer sends unicast packets to the controlling badge, acknowledging that control has been released, and containing an audio chime. In step 316, the controlling badge, using multicast packets, relays the audio chime to all other members of the group, where the chime is played over each badge's speaker to inform each user that they can respond. In step 318, the controlling computer starts a software timer, set to a predetermined value, which may be approximately 20 seconds in the preferred embodiment. If this software timer times out before another user attempts to respond, as described in step 320, the controlling computer proceeds to step 400 and terminates the chat session, as described in more detail in FIG. 6. In step 320, if another user or users attempt to respond by pressing and holding his or her call button, those users' badges notify the controlling computer using unicast packets. Upon receiving the first response, assuming it occurs before the software timer in step 318 has expired, the controlling computer disables the software timer in step 322, so it can no longer time out, and in step 324 uses unicast packets to notify the responding badge that it has gained control of the chat session, also sending an audio chirp to be played over that badge's speaker, informing the user that he or she may begin talking. At this point, the new controlling badge enters the same state described in step 272 of FIG. 4, transmitting a speech signal using the allocated multicast IP address. All other badges in the chat group remain in the state described in step 268 of FIG. 4, listening for voice communications on the allocated multicast address and playing any received voice over their speakers. If additional badges attempt to respond after the first responding badge has been granted control, the controlling computer uses unicast packets to send those badges an audio warning tone to be played over their speakers, informing the users that they have lost out in the contention to respond, and will not be heard by other group members if they talk.

Figure 6:
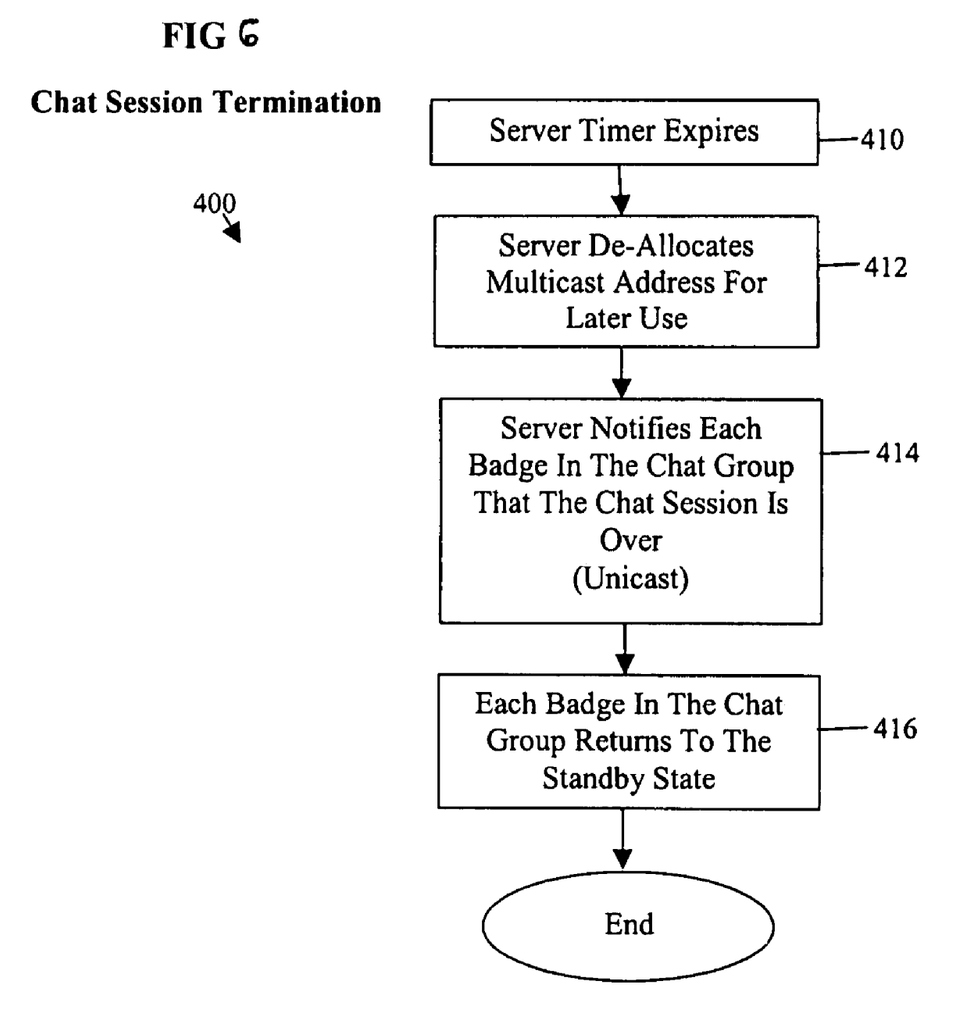
FIG. 6 is a diagram illustrating an example of termination of a chat room session implemented using the voice controlled communications system described above.

FIG. 6 illustrates an example of termination of a chat session, which happens if the software timer described in step 318 of FIG. 5 is allowed to expire. In step 412, the controlling computer de-allocates the multicast IP address used for the chat session, allowing it to be reused for a later chat session. In step 414, the controlling computer notifies each of the badges in the chat group that the chat session has ended using a unicast packet to each badge. In step 416, each badge in the chat group returns to the standby state, to reduce power consumption and conserve battery life.

The chat room system in accordance with the invention resolves the complex tradeoffs between power consumption and system latency described above, and does so in a way that makes optimal use of multicast packets, to avoid limitations on packet processing rate in the network infrastructure of the wireless communications system. Note that in a given chat session, badges transition from standby mode to active mode only once, at the beginning of the session, before any of the chat group members begin talking. Note also that although unicast packets are used as needed for communication between the controlling computer and a single badge, communication using unicast packets which must go to each badge in the chat group only occurs at the very beginning of the session, to initiate the session, and at the end of the session, to terminate it. In these cases where unicast packets must be sent to each badge, audio signals, which require a large number of packets, are not sent. Thus, the total number of packets which must be sent over the network is kept as low as possible.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. A chat group system, comprising:
a controlling computer having a processor that executes computer instructions;
two or more access devices each having a processor that executes computer instructions wherein the access devices communicate with the controlling computer and wherein a first access device requests a chat session by communicating with the controlling computer, the two or more access devices being heterogeneous devices; and
wherein the controlling computer further comprises a chat group module having a chat group session manager and an address assignment module, the address assignment module further comprising computer instructions that assign a multicast internet protocol address to the chat session and the chat group session manager further comprising computer instructions that communicate a chat request command with the multicast internet protocol address to the access devices associated with the chat session and computer instructions that start a timer when the first access device completes its transmission over the multicast internet protocol address wherein the multicast internet protocol address for the chat session remains assigned to the chat session as long as another transmission over the multicast internet protocol address occurs before the timer times out.

2. The system of claim 1, wherein each access device further comprises a badge, a computing device with a badge application, a phone, a cellular phone, a mobile phone, a Smart phone, a Blackberry-type device with a built-in communications capability, a Palm operating system based device with a communications capability or a Windows CE-based device with a communications capability.

3. The system of claim 1 further comprising one or more concentrators connected to the controlling computer by a network wherein each access device interacts with at least one concentrator when the access device is within a coverage area of the at least one concentrator.

4. The system of claim 3, wherein each concentrator further comprises a cellular base station, a wireless 802.11 (b) or (g) access point, a mobile device data access point or a pager base station.

5. The system of claim 1, wherein the computer instructions that start the timer further comprises computer instructions that disable the timer each time that an access device transmits over the multicast internet protocol address and computer instructions that restart the timer each time a transmission over the multicast internet protocol address is completed whereby the chat session remains active while at least one transmission occurs over the multicast internet protocol address before the timer times out.

6. The system of claim 1, wherein the address assignment module further comprises computer instructions, when the timer times out, that revoke the multicast internet protocol address from the chat session to terminate the chat session and computer instructions that generate a unicast packet to each access device associated with the chat session to terminate the chat session wherein each access device associated with the chat session further comprises computer instructions that, in response to the termination packet, transitions the access device from an active state to a standby state.

7. The system of claim 1, wherein each access device, associated with the chat session, further comprises a computer instruction, executed by a processor of the access device, that transitions the access device from a standby state to an active state upon receipt of the chat request command from the controlling computer.

8. The system of claim 1, wherein the first access device further comprises a call button and wherein requesting the chat session is accomplished by depressing and holding the call button.

9. The system of claim 8, wherein the first access device further comprises computer instructions that generate a unicast packet to the controlling computer to request a chat session.

10. The system of claim 1, wherein the first access device further comprises computer instructions that release the multicast internet protocol address for the chat session when the first access device has completed transmission and wherein the controlling computer further comprises computer instructions, in response to the release of the multicast internet protocol address by the access device, that cause an audible signal to be generated by the access devices associated with the chat group indicating that the multicast internet protocol address is available for a transmission.

11. The system of claim 10, wherein the audible signal indicating the availability of the multicast internet protocol address is communicated to the first access device via a plurality of unicast packets and the first access device further comprises computer instructions that communicate a plurality of multicast packets forwarding the audible signal to the other access devices that are part of the chat session.

12. The system of claim 11, wherein a second access device further comprises computer instructions that generates a unicast packet to the controlling computer to request control of the multicast internet protocol address after the first access device releases the multicast internet protocol address and wherein the controlling computer further comprises computer instructions that generate a chime on the second access device indicating that the second access device has control of the multicast internet protocol address and computer instructions that generate a warning tone on any other access devices that attempt to take control of the multicast internet protocol address, after the second access device has already been granted control of the multicast internet protocol address, indicating that control cannot be granted to the multicast internet protocol address.

13. The system of claim 10, wherein the first access device further comprises a call button and wherein releasing the multicast internet protocol address is accomplished by releasing the call button.

14. The system of claim 13, wherein the first access device further comprises computer instructions that generate a unicast packet to the controlling computer to release the multicast internet protocol address.

15. The system of claim 1, wherein the timer further comprises twenty seconds.

16. A chat session method implemented using a controlling computer and two or more heterogeneous access devices wherein the access devices communicate with the controlling computer, the method comprising:

requesting a chat session by a first access device connected to the controlling computer;

assigning, by the controlling computer, a multicast internet protocol address to the chat session;

communicating a chat request command with the multicast internet protocol address to the access devices associated with the chat session; and starting a timer, in the controlling computer, when the first access device completes its transmission over the multicast internet protocol address wherein the multicast internet protocol address for the chat session remains assigned to the chat session as long as another transmission over the multicast internet protocol address occurs before the timer times out.

* * * * *